United States Patent [19]

Vanderlei

[11] Patent Number: 4,518,299

[45] Date of Patent: May 21, 1985

[54] ROUND BALE CARRIER AND UNROLLER

[76] Inventor: Clarence B. Vanderlei, R.R. 1, Springfield, S. Dak. 57062

[21] Appl. No.: 469,398

[22] Filed: Feb. 24, 1983

[51] Int. Cl.³ .............................................. A01D 87/12
[52] U.S. Cl. .................................. 414/24.6; 414/482; 414/491; 242/86.5 R
[58] Field of Search ...................... 414/24.5, 24.6, 911, 414/469, 482, 486, 491; 242/86.5 R

[56] References Cited

U.S. PATENT DOCUMENTS

| | | | |
|---|---|---|---|
| 3,877,595 | 4/1975 | Edelman | 414/24.5 |
| 3,944,095 | 3/1976 | Brown | 414/24.5 |
| 4,053,069 | 10/1977 | Love | 414/24.5 |
| 4,095,706 | 6/1978 | Schwien et al. | 414/24.6 |
| 4,280,777 | 7/1981 | Gray | 414/24.6 |
| 4,298,301 | 11/1981 | Carter et al. | 414/24.6 |

Primary Examiner—Robert J. Spar
Assistant Examiner—Lyle Kim
Attorney, Agent, or Firm—Harvey B. Jacobson

[57] ABSTRACT

A load carrier is provided including a trailer main frame defining front and rear end portions and provided with hitch structure at the front end portion. The rear end portion of the main frame includes opposite side support wheels and an upstanding lift frame is pivotally supported at its lower end from the rear end portion of the main frame for swinging about a horizontal transverse axis forward of the wheels between a first rearwardly and upwardly inclined position with an upper portion of the lift frame disposed rearward of the wheels and a second position with the upper end portion swung forwardly to a position forward of the axis of rotation of the wheels. A winch is carried by the main frame for pulling the lift frame upper portion forwardly toward second position thereof. The lift frame and main frame include coacting abutment structure defining a limit position of swinging movement of the lift frame from the first position to the second position and opposite sides of the upper portion of the lift frame include gripping structure for gripping a load disposed therebetween. The lift frame, when in the second position, is balanced to swing by gravity to the first position from the second position, even when a load is not supported from the gripping structure. Further, the lift frame includes a lower tine frame swingably supported therefrom for cradling the lower periphery of an associated load such as a round hay bale.

11 Claims, 5 Drawing Figures

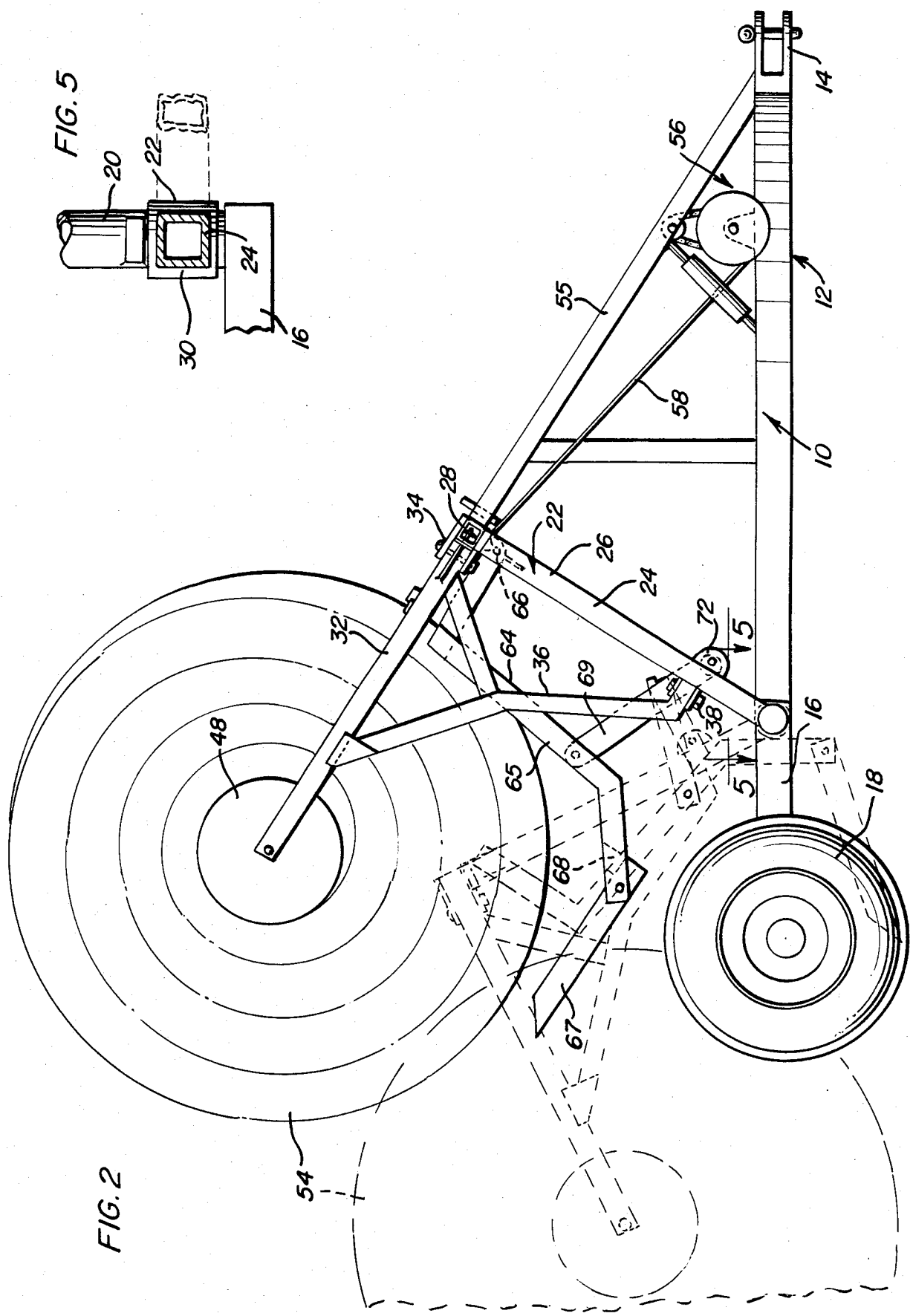

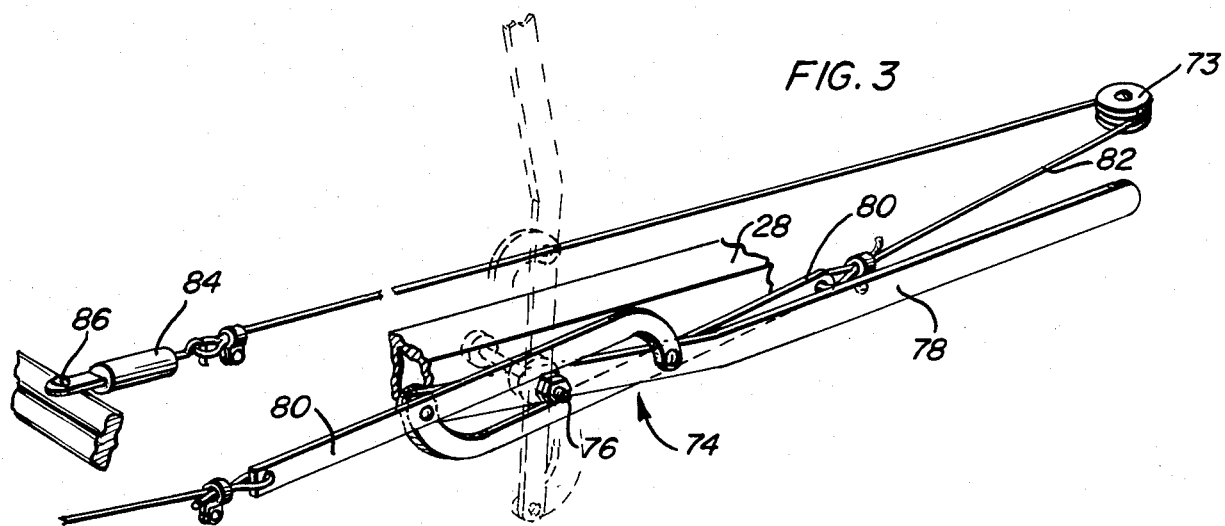
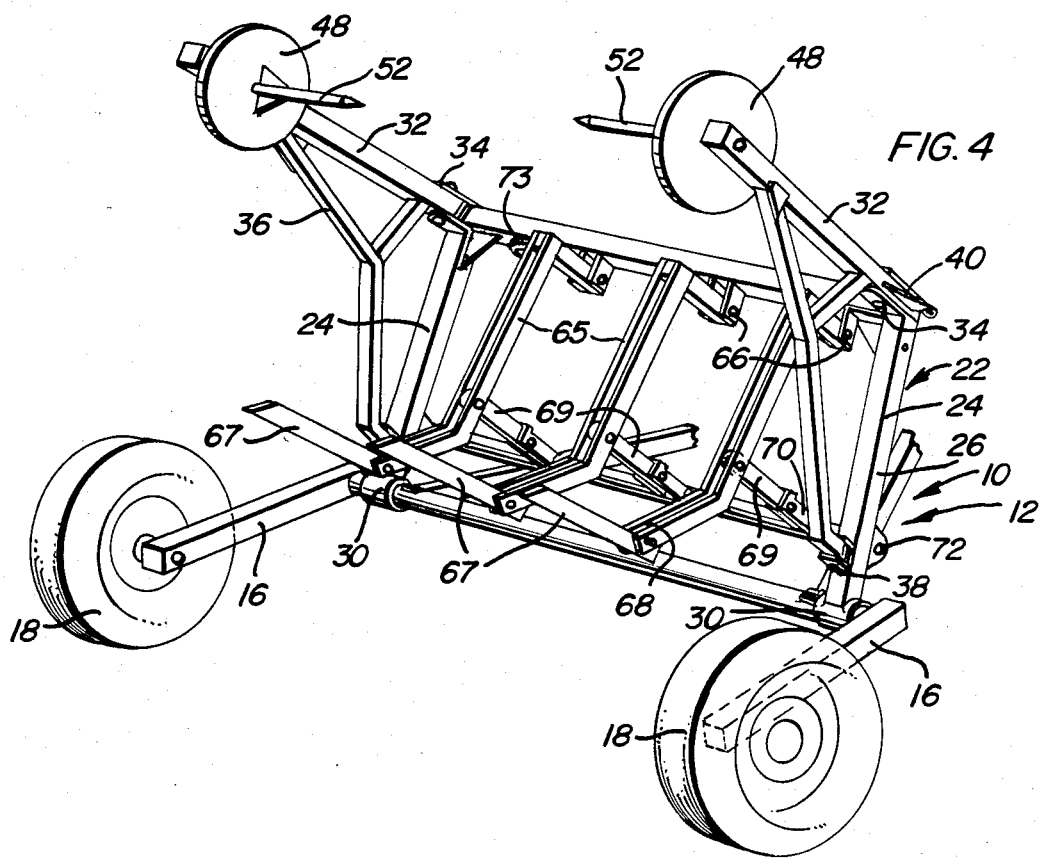

ROUND BALE CARRIER AND UNROLLER

BACKGROUND OF THE INVENTION

The formation, transporting and storage of round hay bales is enjoying increasing popularity due to the fact that round hay bales may be more easily formed from windrowed hay, round hay bales may be more easily loaded onto transport vehicles and round hay bales may be more readily loaded onto a transport vehicle from a storage area and transported to a feeding area.

Because of the increased popularity of round hay bales a structure capable of picking up round hay bales, transporting round hay bales to a storage area and subsequently retrieving the round hay bales from a storage area and transporting the hay bales to a feeding area and thereafter unrolling the hay bales on the ground is needed.

Examples of hay bale handling equipment capable of performing at least some of the above mentioned tasks are disclosed in U.S. Pat. Nos. 3,877,595, 3,908,846, 3,944,095, 4,053,069, 4,095,706, 4,103,831, 4,215,963 and 4,297,065.

BRIEF DESCRIPTION OF THE INVENTION

The hay bale carrier and unroller of the instant invention has been designed for towing behind a farm tractor, pickup truck or other vehicle which may be found on a farm and is constructed in a manner whereby a cylindrical hay bale to be transported may be engaged and picked up from the ground merely as a result of throwing a single lever and thereafter operating a manual or electrically driven winch. Although the invention may include a manual winch, an electrically driven winch is more desirable.

A lift frame is pivotally supported from a trailer frame for swinging about a horizontal transverse axis and the lift frame includes opposite side rearwardly projecting arms whose free ends may be swung toward and away from each other for gripping and releasing a hay bale disposed therebetween. The arms are spring biased toward positions with the free ends thereof displaced away from each other and an over center lever mechanism is carried by the lift frame and operatively connected to the arms for manually swinging the arms toward the hay bale engaging and lifting positions thereof. The winch and cable are operative to swing the lift frame from its rearmost lower position toward its forwardmost raised position and in the latter position the lift frame is swingable by gravity, upon allowing slack in the cable, toward the rearmost lowered position. In this manner, the winch and cable structure may be maintained of simple design and construction and yet still perform the desired task of swinging the lift frame from a lowered position to a raised position after the lift arms have been compressively engaged with a hay bale disposed therebetween.

The main object of this invention is to provide a round hay bale carrier and unroller which may be conveniently utilized to retrieve round hay bales from a field and transport the hay bales from the field to a point of storage and to thereafter transport the hay bales from the storage point to a feeding area.

Another object of this invention is to provide a round hay bale carrier and unloader constructed in a manner such that round hay bales of varying diameters may be handled thereby.

Still another important object of this invention is to provide a round hay bale carrier and unroller which may be utilized to unroll a round hay bale in a feeding area after the carrier has been used to transport the round bale from a storage area to the feeding area.

A final object of this invention to be specifically enumerated herein is to provide a bale carrier and unroller in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is a side elevational view of the assemblage illustrated in FIG. 1 with the lift frame illustrated by solid lines in the elevated position and in phantom lines in the lowered position;

FIG. 3 is a fragmentary perspective view illustrating the single lever control which is operative to shift the lift arms between the bale engaging and bale releasing positions thereof;

FIG. 4 is a fragmentary perspective view of the bale carrier and roller with the lift frame in a raised position; and FIG. 5 is an enlarged fragmentary horizontal sectional view taken substantially upon the plane indicated by the section line 5—5 of FIG. 2.

DETAILED DESCRIPTION OF THE INVENTION

Figure 1:
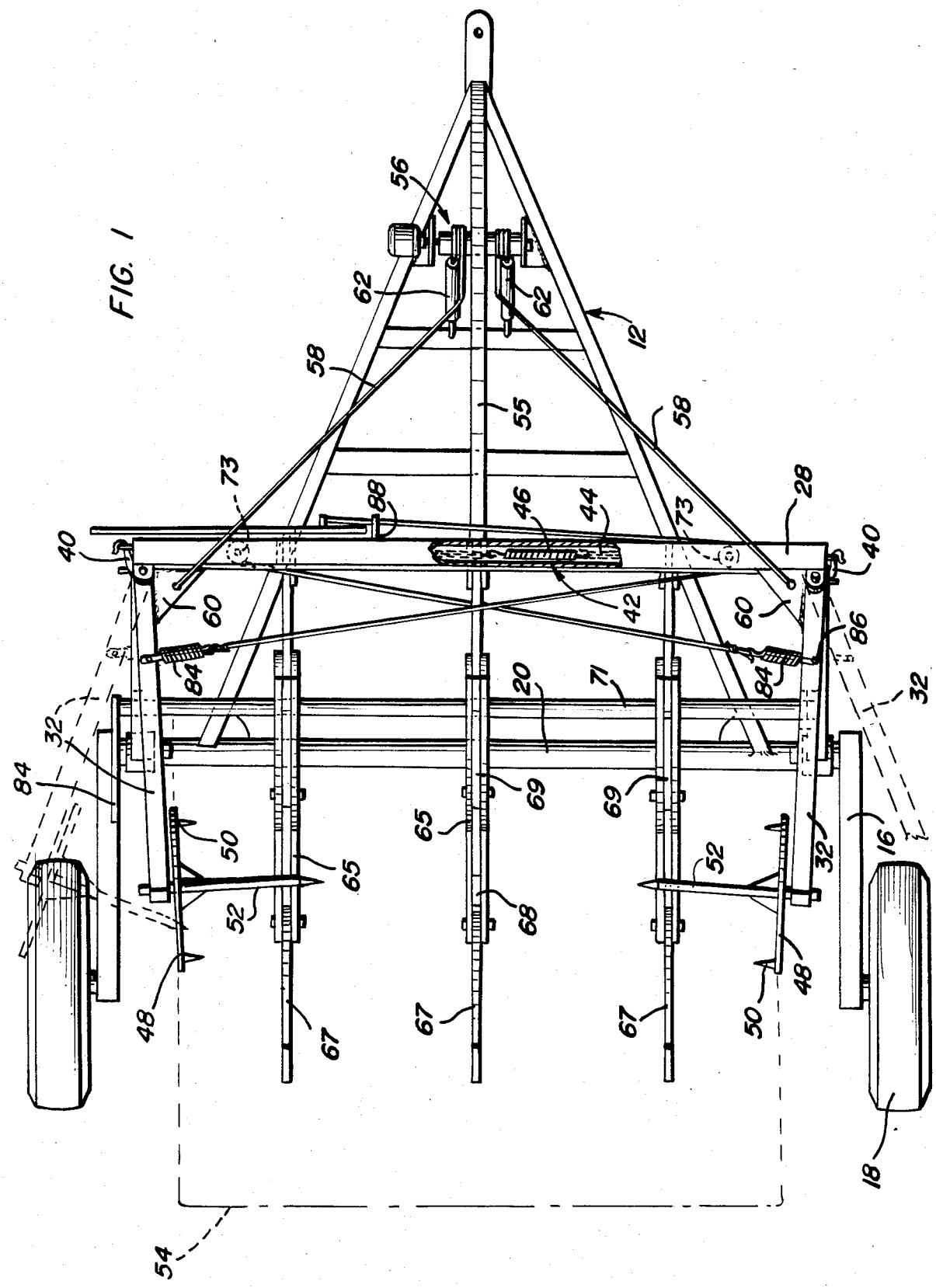
FIG. 1 is a top plan view of the instant invention with operative positions of the bale engaging arms illustrated in solid lines and inoperative positions of the arms illustrated in phantom lines.

Referring now more specifically to the drawings, the numeral 10 generally designates the bale or load carrier of the instant invention. The carrier 10 includes a main trailer frame referred to in general by the reference numeral 12 equipped with hitch structure 14 on its forward end and opposite side rearwardly directed wheel support arms 16 on its rear end. A pair of opposite side support wheels 18 are journaled from the rear ends of the arms 16 and the front ends of the arms 16 are anchored to opposite ends of a rear transverse member 20 of the main frame 12.

A lift frame referred to in general by the reference numeral 22 is provided and includes an inverted U-shaped portion 24 comprising a pair of upstanding opposite side members 26 interconnected at their upper ends by an upper tubular transverse member 28 and provided with transverse sleeve journal portions 30 at their lower ends rotatably mounted on the opposite ends of the rear transverse member 20. The lift frame additionally includes a pair of opposite side lift arms 32 pivotally supported from the junctures of the upper ends of the upstanding side portions 24 and the opposite ends of the transverse tubular member 28 as at 34 and the opposite side lift arms 32 project rearwardly from the opposite ends of the transverse tubular member 28 and include inclined braces 36 anchored at their upper ends to the free end portions of the lift arms 32 and pivotally anchored as at 38 to the lower end portions of the upstanding side portions 24. The lift arms 32 are swingable between the phantom and solid line positions thereof illustrated in FIG. 1 about axes which parallel the upstanding side portions 24 and the base ends of the lift arms 32 include hooks 40 supported therefrom in alignment with the open opposite ends of the transverse member 28.

An elongated tension member assembly referred to in general by the reference numeral 42 is provided and extends longitudinally of the interior of the tubular transverse member 28. The tension member assembly 42 includes a pair of opposite end link chain sections 44 and an intermediate expansion spring center section 46. The remote ends of the link chain sections 44 are engaged with the hooks 40 and the expansion spring center section 46 thereby serves to yieldingly bias the lift arms 32 toward the phantom line positions thereof illustrated in FIG. 1 from the solid line positions illustrated in FIG. 1.

The free rear ends of the lift arms 32 are equipped with rotary discs 48 journaled therefrom about horizontal transverse axes and disposed on the inner sides of the arms 32. The discs 48 are equipped with peripherally spaced short spikes 50 and long center spikes 52 for engaging opposite ends of a cylindrical hay bale 54 disposed between the free rear ends of the lift arms 32.

The frame 12 includes a rearwardly and upwardly inclined center abuttment bar 55 with whose rear upper end the mid-portion of the tubular transverse member 28 is abuttingly engageable to limit rear upward swinging of the lift frame 22 to the solid line position thereof illustrated in FIG. 2, an electrically driven winch assembly referred to in general by the reference numeral 56 being carried by a forward portion of the main frame 12 and having a pair of cables 58 wound thereon and anchored relative to gusset plates 60 secured between the opposite ends of the tubular transverse member 28 and the upper ends of the opposite side members 26. The forward portion of the main frame 12 includes guide rollers 62 between which the ends of the cables 58 adjacent the winch assembly 56 are guidingly received. If it is desired, the winch assembly 56 may be provided with a crank for hand operation, and it will be noted that the winch assembly 56 may include a ratchet assembly (not shown) for releasably locking the cables 58 against unwinding from the winch portion thereof.

A tine frame referred to in general by the reference numeral 64 is provided and includes three parallel arms 65 whose base ends are pivotally supported from longitudinally spaced portions of the rear transverse member 28 as at 66. The arms 65 substantially parallel the lift arms 32 and pivotally support three tines 67 from the free tower ends thereof. The tines 67 engage stops 68 carried by the arms 65 to limit downward swinging of the rear ends of the tines 67. Each arm 65 includes a forwardly directed pivotal link 69 whose forward end is pivoted to the free end of a stop equipped arm 70 carried by an oscillatable transverse shaft 71 extending between and oscillatably supported from mounts 72 carried by the side members 26.

The opposite ends of the transverse member 28 have a pair of pulley wheels 73 journaled from the underside thereof and a lever assembly referred to in general by the reference numeral 74 is pivotally supported from the forward side of the transverse member 28 as at 76 and includes an operating lever 78 and a pair of pull levers 80 including one pair of ends pivotally attached to the operating lever on opposite sides of the pivot axis 76 and remote ends of the pull levers 80 have one pair of corresponding ends of a pair of pull cables 82 anchored thereto. The pull cables 82 are passed about the pulley pulley wheels 73 and the ends thereof remote from the pull levers 80 are provided with expansion springs 84 anchored relative to the lift arms 32 as at 86. The transverse member 28 includes a stop pin 88 supported therefrom with which the free end of the operating lever 78 is engageable to limit swinging movement of the operating lever 78 to the release position and the pin 88 is engaged by one of the pull levers 80 to limit swinging movement of the operating lever 78 to the over center position illustrated in FIG. 3 in which the rear ends of the arms 32 are pulled inwardly toward their operative positions.

In operation, the bale or load carrier 10 may be coupled behind any suitable prime mover such as a tractor or pick-up truck through the utilization of the hitch structure 14. Thereafter, the carrier 10 may be trailed to a field in which cylindrical or round bales are disposed on the ground. Then, the winch assembly 56 may be actuated to allow the lift frame 22 to swing by gravity from the solid line position thereof illustrated in FIG. 2 to the phantom line position in FIG. 2. As the lift frame 22 approaches the phantom line position thereof illustrated in FIG. 2, the tines 67 will engage the ground and rest thereon as the lift frame 22 completes its swinging movement to the rear lower position thereof. Thereafter, the trailer may be backed into position to receive the bale 54 between the rear ends of the lift arms 32 and the control lever 78 may be swung to the operative position thereof whereby the lift arms 32 will be swung from the phantom line positions thereof illustrated in FIG. 1 inwardly to the solid line positions of FIG. 1 in order to grip and compressively engage the bale 54 from its opposite ends. Of course, the spikes 52 should be substantially centered in the bales. Thereafter, the winch assembly 56 may be actuated and the lift arms 32 will then be swung from the phantom line positions of FIG. 2 to the solid line positions of FIG. 2 and the tines 67 will underly and support at least a portion of the weight of the bale 54. When the transverse member 28 abuts the abutment portion 54, operation of the winch assembly 56 may be terminated and a suitable ratchet mechanism may be utilized to releasably prevent unwinding of the cables 58. Thereafter, the carrier may then be utilized to transport the bale 54 to a point of storage.

If it subsequently is desired to transport the bale 54 from the storage area to the field for feeding purposes, the bale 54 is again picked up and transported to the field area. Thereafter, the ratchet mechanism on the winch assembly 56 is disengaged and the winch assembly 56 is operated to lower to lift frame 22 from the position thereof illustrated in solid lines in FIG. 2 to the unloading position thereof illustrated in phantom lines in FIG. 2. Thereafter, the crank lever 84 on the left end of the shaft 71 may be swung to forwardly retract the lower portion of the tine frame 64. At this point, the carrier 10 may be moved slowly over the ground in order that the bale 54, may unwind along the ground and as the bale 54 is unwinding the lift frame 22 continues to be lowered to the ground in order that the lower periphery of the progressively smaller diameter bale being unwound is in contact with the ground and thus causes the bale to rotate as the carrier 10 is moved over the ground.

From FIG. 2 of the drawings it will be noted that the lift frame 22 comprises not only the opposite side members 26 and the transverse member 28 but also the lift arms 32 and the braces 36. Further, even when the lift frame 22 is in the raised position thereof illustrated in FIG. 2 of the drawings it is overbalanced to the rear of the carrier 10 whereby any slack in the cables 58 will cause the lift frame to swing by gravity toward the phantom line position of FIG. 2. Still further, it will be noted that the free ends of the arms 32 from which the bale 54 may be supported are disposed rearward of a vertical plane containing the wheels 18 when the lift frame 22 is in the lowered position, but that the discs 48 are disposed forward of a vertical plane containing the axes of rotation of the wheels 18 when the lift frame 22 is in the raised position. Accordingly, when the lift frame 22 is being utilized to lift the bale 54 from the ground, the weight of the bale is disposed rearward of the wheels. However, when the lift frame 22 is in the raised position illustrated in phantom lines in FIG. 2 of the drawings, the weight of the supported bale is disposed forward of the wheels 18 and is therefore transferred to the hitch structure 14.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A load carrier including a wheeled trailer main frame defining front and rear end portions and provided with hitch structure at said front end portion, the rear end portion of said main frame including opposite side support wheels, an upstanding lift frame pivotally supported at its lower end from the rear end portion of said main frame for swinging about a horizontal transverse axis between a first rearwardly and upwardly inclined position and a second position with said upper portion swung forwardly, force means operatively connected between said lift and main frames for selectively swinging said lift frame from said first position to said second position, said load gripping means including a pair of opposite side arms pivotally supported from upper opposite side portions of said lift frame and projecting rearwardly therefrom, actuator means carried by said lift frame and operatively connected to said arms for swinging the free ends of said arms toward and away from each other for gripping and releasing a load therebetween an upstanding tine frame including a plurality of elongated upstanding arms each including a rearwardly projecting tine supported from its lower end, the upper ends of said arms being pivotally supported from the upper portion of said lift frame for limited angular displacement about a horizontal transverse axis with the lower ends of said arms being swingable toward and away from the axis of rotation of said lift frame relative to said main frame, and means operative to selectively angularly displace said tine frame relative to said lift frame.

2. The load carrier of claim 1 wherein said lift frame, when in said second position, is rearwardly and upwardly inclined and balanced to swing by gravity back to said first position, even when a load is not supported from said gripping means.

3. The load carrier of claim 1 wherein said force means includes a winch carried by said main frame and a cable wound on said winch and having a free end extending rearwardly to said winch and anchored relative to an upper portion of said lift frame.

4. The load carrier of claim 1 wherein the free rear ends of said lift arms include bale end engaging panels journaled therefrom for rotation about horizontal axes extending transversely of said lift arms and with said panels disposed to the adjacent sides of said lift arms.

5. The load carrier of claim 4 wherein said panels include central spike portions projecting outwardly therefrom toward each other for impaling the center portions of the opposite ends of a round bale disposed between the free ends of said arms.

6. A load carrier including a wheeled trailer main frame defining front and rear end portions and provided with hitch structure at said front end portion, the rear end portion of said main frame including opposite side support wheels, an upstanding lift frame pivotally supported at its lower end from the rear end portion of said main frame for swinging about a horizontal transverse axis between a first rearwardly and upwardly inclined position with an upper portion of said lift frame disposed rearward of said wheels and a second position with said upper portion swung forwardly to a position forward of the axis of rotation of said wheels, said lift frame and main frame including coacting abutment means defining a limit position of swinging movement of said lift frame from said first position to said second position, force means operatively connected between said lift and main frames for selectively said lift frame from said first position to said second position, said upper portion including load gripping means at opposite sides of said lift frame for gripping opposite side portions of a load disposed therebetween, said load gripping means including a pair of opposite side lift arms pivotally supported from upper opposite side portions of said lift frame and projecting rearwardly therefrom, means operatively connected to said arms for yieldingly biasing the free rear ends of lift arms away from each other, actuator means carried by said lift frame and operatively connected to said arms for swinging the free ends of said lift arms toward each other for gripping a load therebetween, an upstanding tine frame including a plurality of elongated upstanding arms each including a rearwardly projecting tine supported from its lower end, the upper ends of said arms being pivotally supported from the upper portion of said lift frame for limited angular displacement about a horizontal transverse axis with the lower ends of said arms being swingable toward and away from the axis of rotation of said lift frame relative to said main frame, and means operative to selectively angularly displace said tine frame relative to said lift frame.

7. The load carrier of claim 6 wherein said tines are pivotally supported from said arms for limited oscillation relative thereto about horizontal axes extending transversely of said main frame.

8. The load carrier of claim 6 wherein the free rear ends of said lift arms includes bale end engaging panels journaled therefrom for rotation about horizontal axes extending transversely of said arms and with said panels disposed to the adjacent sides of said lift means.

9. The load carrier of claim 8 wherein said panels include central spike portions projecting outwardly therefrom toward each other for impaling the center portions of the opposite ends of a round bale disposed between the free ends of said arms.

10. The load carrier of claim 9 wherein said lift frame, when in said second position, is rearwardly and upwardly inclined and balanced to swing by gravity back to said first position, even when a load is not supported from said gripping means.

11. The load carrier of claim 10 wherein said force means includes a winch carried by said main frame and a cable wound on said winch and having a free end extending rearwardly to said winch and anchored relative to an upper portion of said lift frame.

* * * * *